United States Patent [19]
Mori

[11] Patent Number: 5,313,565
[45] Date of Patent: May 17, 1994

[54] OUTPUT PROCESSING SYSTEM PERMITTING EFFICIENT LOADING OF MEDIA RESOURCE INFORMATION USED IN AN OUTPUT DEVICE

[75] Inventor: Yoshio Mori, Yokohama, Japan

[73] Assignee: Fujitsu Limited, Kawasaki, Japan

[21] Appl. No.: 661,202

[22] Filed: Feb. 27, 1991

[30] Foreign Application Priority Data

Feb. 27, 1990 [JP] Japan ................................. 2-46785

[51] Int. Cl.$^5$ ............................................. G06F 3/00
[52] U.S. Cl. ................................... 395/118; 395/110; 395/150
[58] Field of Search ................. 364/DIG. 1, DIG. 2; 395/101, 102, 109, 110, 111, 117, 118, 150, 148, 162; 382/9

[56] References Cited
U.S. PATENT DOCUMENTS

4,574,395  3/1986  Kato ................................. 395/118 X

Primary Examiner—Robert L. Richardson
Attorney, Agent, or Firm—Staas & Halsey

[57] ABSTRACT

In a system comprising a data processing unit and at least one output device, the data processing unit extracts from output information prepared by an application program media resource information needed in outputting the output information from the output device. The data processing unit reads needed media resource information from media resource storage on the basis of the extracted information, downloads the read media resource information into the output device and then outputs the output information to the output device to initiate an outputting process.

19 Claims, 12 Drawing Sheets

OUTPUT PROCESSING SYSTEM PERMITTING EFFICIENT LOADING OF MEDIA RESOURCE INFORMATION USED IN AN OUTPUT DEVICE

BACKGROUND OF THE INVENTION

1. Field of the Invention

The present invention relates to an output processing system for achieving efficiency in preparing various types of fonts and form overlay information specified for output processing in a computer system.

2. Description of the Related Art

Figure 1:
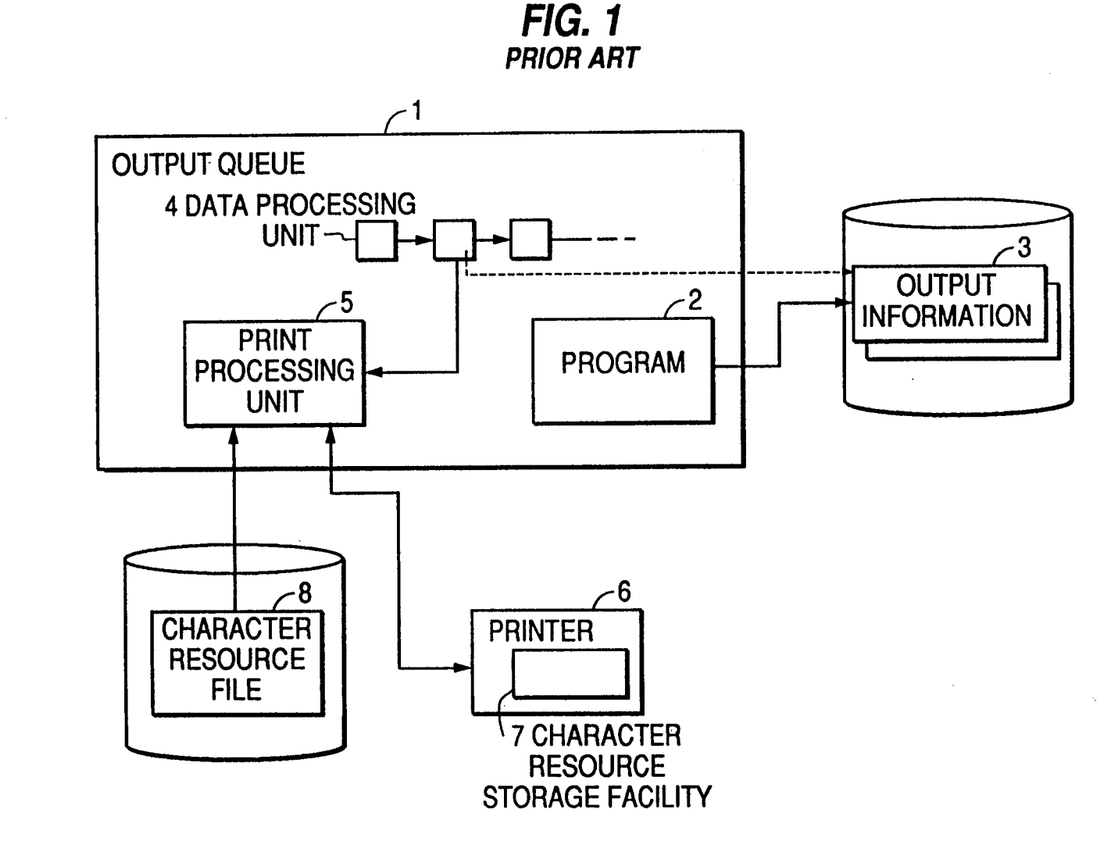
FIG. 1 is a schematic block diagram of a conventional output processing system.

FIG. 1 is a block diagram of a computer system. When processing results of an application program executed by a data processing unit 1 are printed out, output information 3 to be printed is temporarily stored in magnetic disk storage, for example, in an output queue 4. The output information 3 placed in the output queue 4 is then retrieved in sequence by a print processing unit 5 and fed to a printer 6 for printout.

When a document or a predesigned cut form is printed, the font and size of characters and form overlay are specified in predetermined locations in the output information 3. Thus, various types of character pattern information and form overlay information must be prepared and changed as specified.

To this end, the printer 6 has a character resource storage facility 7 for holding such character pattern information and form overlay information (hereinafter referred to as character resource information). When character resource information specified by the output information to be printed is stored in the character resource storage facility 7, it is used for printing. When the specified character resource information is not stored in the character resource storage facility 7, the printing process is interrupted and necessary character resource information is requested from the printing processor 5.

Figure 2:
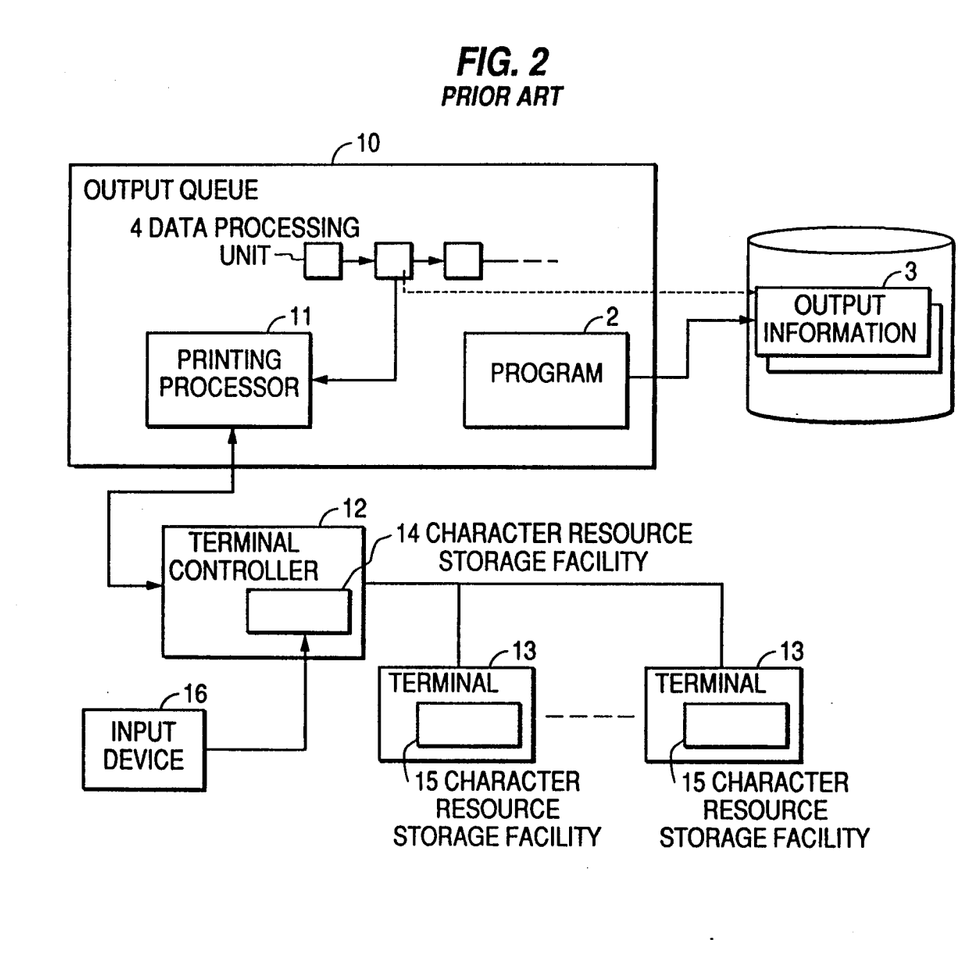
FIG. 2 is a schematic block diagram of another conventional output processing system.

FIG. 2 is a block diagram of another computer system. To print out the processing results of the application program 2 executed by a data processing unit 10, the output information 3 to be printed is temporarily stored in magnetic disk storage before being placed in the output queue 4. When the output information 3 placed in the output queue 4 is information to be output to one of the terminals 13, it is retrieved in sequence by the printing processor 11 and output to a desired terminal 13 for printout via a terminal controller 12.

The terminal controller 12 is generally connected to and controls a plurality of terminals 13 the terminal controller 12 has a character resource storage facility 14 to store character resource information which is shared among the terminals 13. To this end, required character resource information stored, for example, on a magnetic floppy disk is read and loaded in advance into the character resource storage facility 14 via an input device 16.

The terminal 13 executes a printing process in accordance with the output information 3 received from the printing processor 11 via the terminal controller 12. Each of the terminals stores character resource information used for printing control in its own character resource storage facility 15. If the character resource information specified by the output information is not stored in the character resource storage facility 15, the terminal 13 requests that the terminal controller 12 transfer the specified character resources from the character resource storage facility 14 to its character resource storage facility 15. If, in this case, the terminal controller 12 also does not have the requested character resource information in its character resource storage facility 14, printing stops and the printing processor 11 is notified that the requested character resource is not stored in the character resource storage facility 14.

In the conventional output processing system described above, if the necessary character resource information is not available, the terminal has to interrupt printing to request and receive desired character resource information in the configuration shown in FIG. 1, or stop printing in the configuration shown in FIG. 2. This reduces printing efficiency.

SUMMARY OF THE INVENTION

It is an object of the present invention to provide an output processing system which permits efficient loading of media resource information (characters, images, graphic information, etc.) used in an output device.

According to one aspect of the present invention, a preprocessing section of a data processing unit extracts media resource information (for example, various types of character pattern information which differ in character style, size, etc, image data, graphic data and sound data) that is needed in outputting the output information from the output device from output information prepared by an application program and enters the extracted information and output information into a predetermined queue. The media resource information which is extracted as described above, is called media resource designating information hereinafter.

An output processing section in the data processing unit reads media resource information specified by the information entered into the queue from internal or external media resource storage, loads the read media resource information into the output device and then outputs the output information to the output device to initiate an outputting process.

The media resource information that is needed in outputting the output information from the output device is thereby loaded into the output device beforehand. This avoids interruption or stopping of the outputting process due to lack of media resource information after the initiation of the outputting process. Thus, processing efficiency in the data processing unit and the output device can be improved.

DESCRIPTION OF THE PREFERRED EMBODIMENTS

Figure 3:
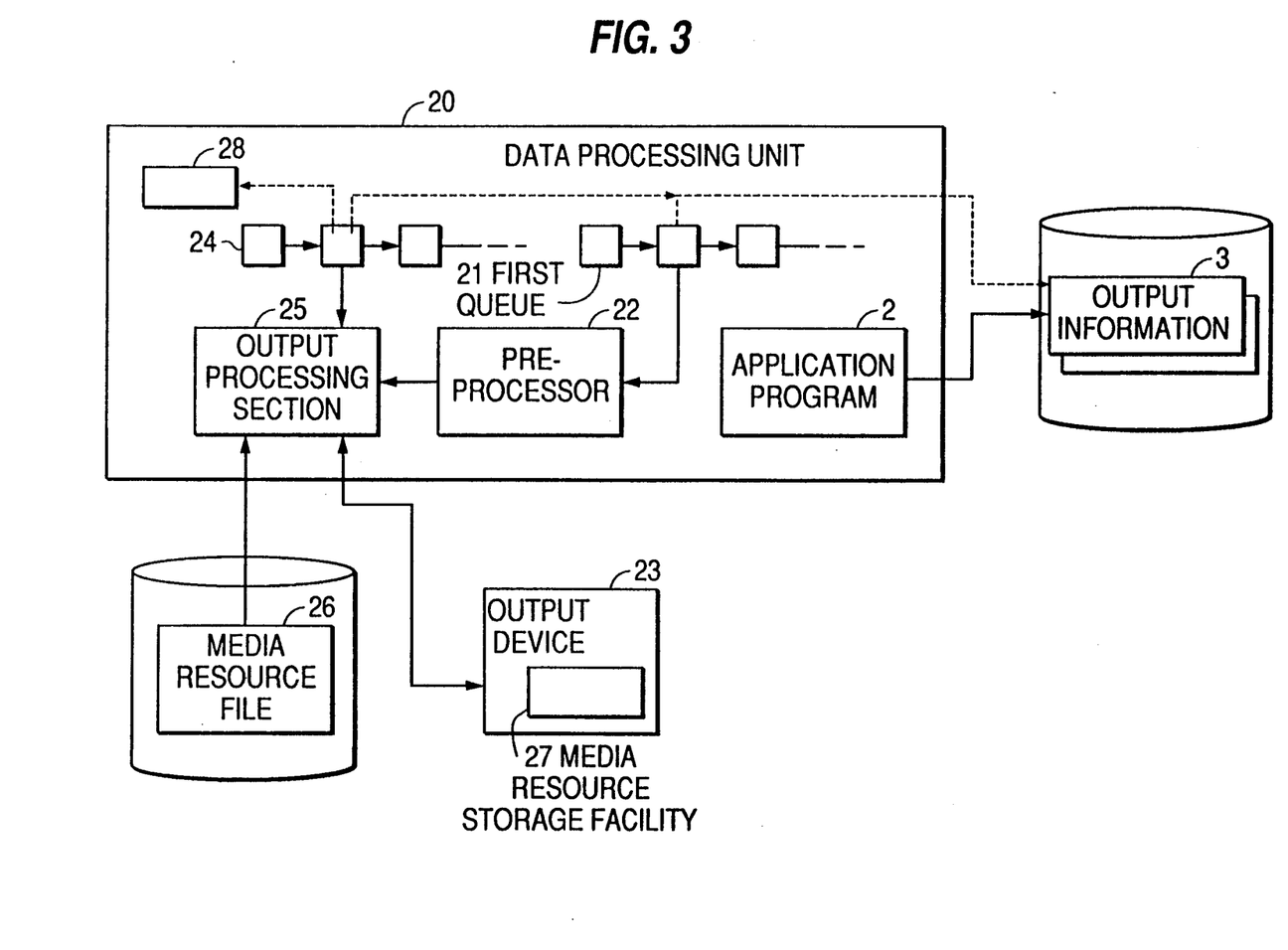
FIG. 3 illustrates an output processing system according to a first embodiment of the present invention.

FIG. 3 illustrates a first embodiment of the present invention. In FIG. 3, like reference characters are used to designate parts corresponding to those in FIGS. 1 and 2 and their descriptions are omitted.

Output information 3 prepared by the application program 2 and executed in a data processing unit 20 is entered into a first queue 21.

A preprocessor 22 reads output information 3 (display data, print data, etc) entered into, for example, the first queue 21 in sequence and extracts from the output information 3 media resource designating information designating media resource information (characters, images, graphs, etc) which is necessary in outputting the output information 3 from the output device 23. The extracted media resource designating information is entered into a second queue 24 together with the output information 3. Output information designating information registered in the second queue 24 comprises, for example, address information at which the output information is stored in a magnetic storage device. The media resource designating information comprises information constituting a key to the media resource information, such as address information at which the media resource information is stored in media resource file 26.

Into the second queue 24 is entered environmental information 28 (form size, form code, emulator, etc, which are currently set in the output device) defining environmental conditions under which individual output devices can operate. The data processing unit is adapted to process output information corresponding to the environmental information 28 by priority.

Suppose that the output device 23 is a printer adapted to print plural types of output information (print data). If the form size currently set in the printer is recognized by the environmental information 28, then the data processing unit can first process the print data which specifies the recognized form size as the size of its print form, thus improving printing efficiency.

The output processing section 25 reads from a media resource file 26 media resource information designated by media resource designating information registered in the second queue 24 and downloads the media resource information into media resource storage 27 in the output device 23. The media resource file 26 stores character, image and graphical information used for printing or display in all of the output devices connected to the system.

The media resource storage facility 27 of the output device 23 has a smaller storage capacity than the media file 26 and stores media resource information individually used by the output device 23.

The output processing section 25 outputs output information 3 to the output device to initiate output processing at the termination of loading of all of the necessary media resource information into the output device.

Next, the operation of the preprocessing section 22 and the output processing section 25 will be described by referring to the flowcharts of FIGS. 4 and 5 taking, as an example, the case where print data prepared by the application program 2 is printed by the output device 23.

Suppose now that the output device 23 is a printer and the media resource file 26 stores character resource information, i.e. character pattern data representing the style, size and type of characters used in the output device 23 and the form overlay information.

Figure 4:
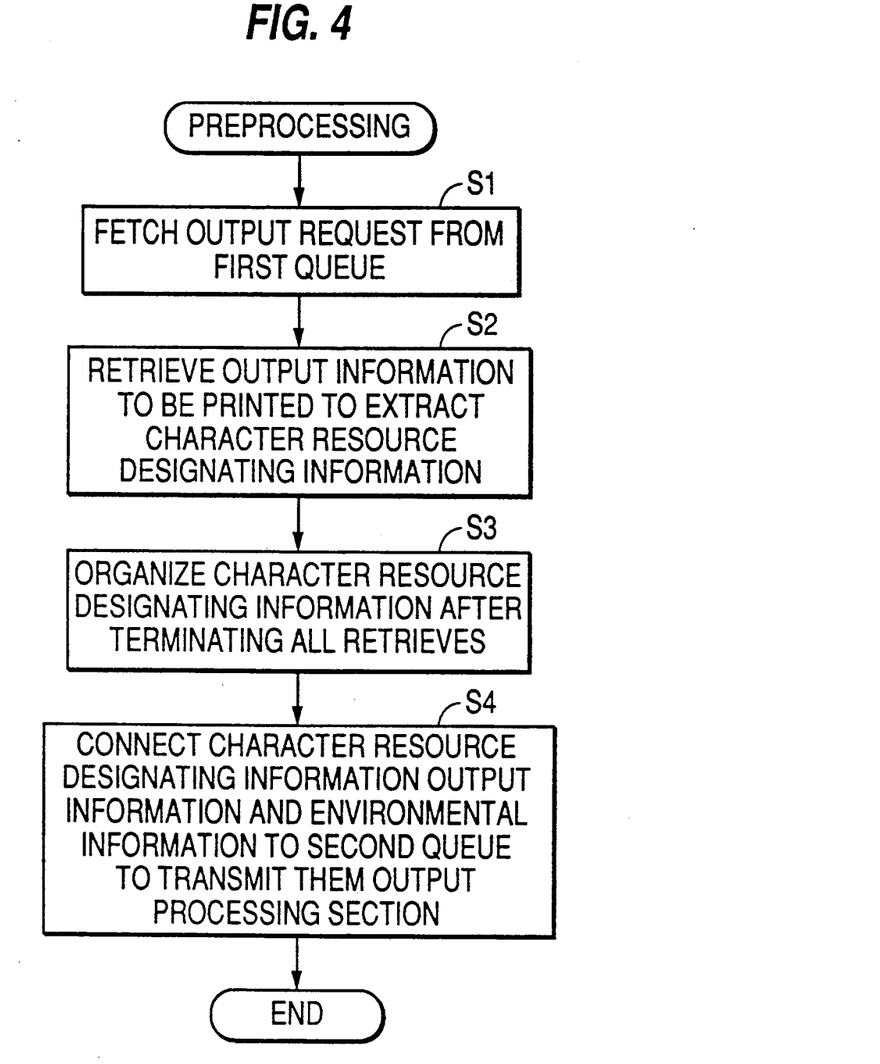
FIG. 4 is a flowchart illustrating the operation of the preprocessing section of FIG. 3.
Figure 5:
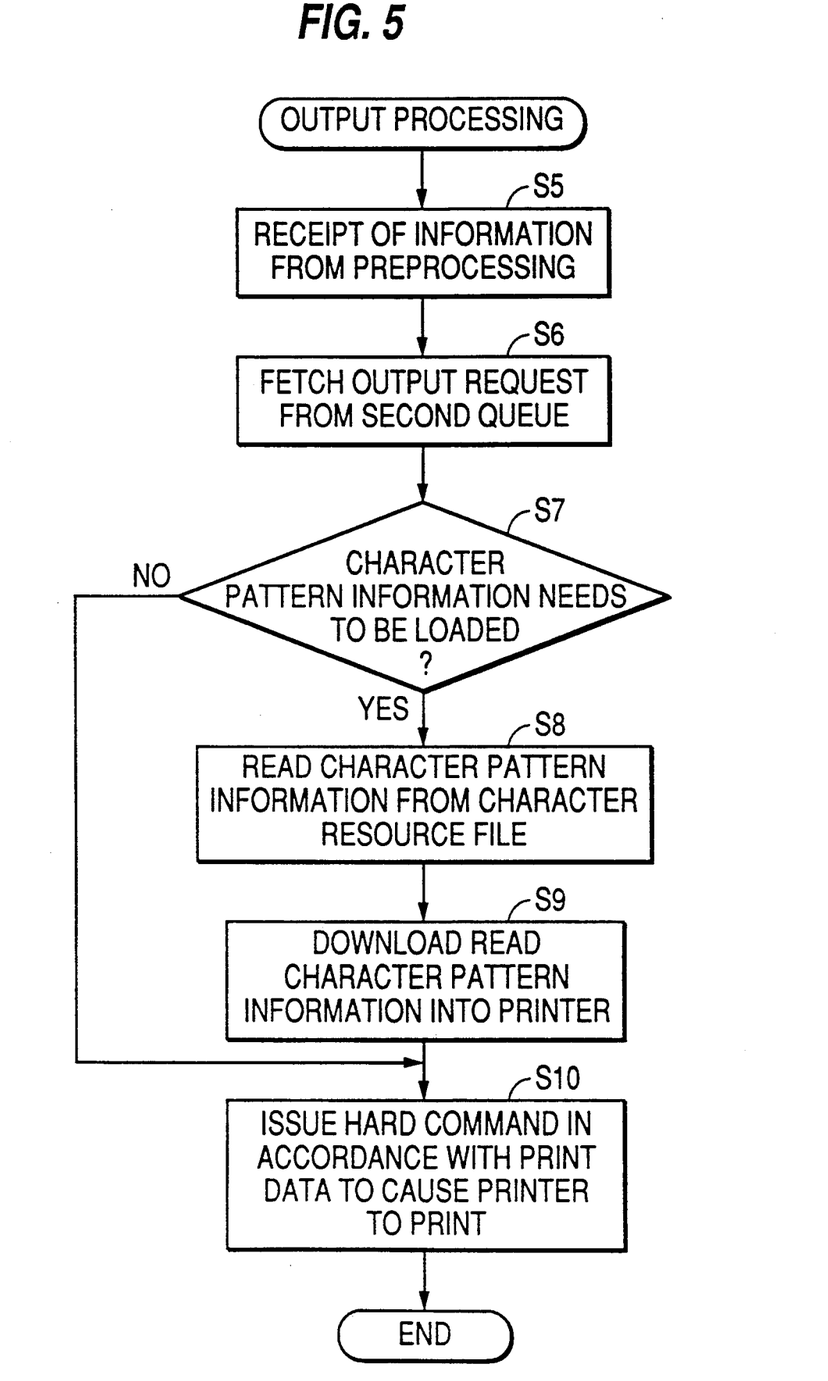
FIG. 5 is a flowchart illustrating the operation of the output processor of FIG. 3.

The preprocessing section 22 retrieves from the first queue 21 output request information which has been entered by the application program 2 into that queue (step S1 in FIG. 4).

Next, the preprocessing section retrieves the output information 3 from the output request information to extract character pattern information (the style, size and type of characters) used for printing (step S2).

Subsequently, the preprocessing section 22 organizes the extracted information to prepare character resource designating information which specifies media resource information necessary for printing (step S3).

Finally, the preprocessing section 22 enters the output information 3 and the extracted character resource designating information into the second queue 24 (step S4).

The operation of the output processing section 25 is described below, with reference to the flowchart of FIG. 5.

Upon receipt of information on the occurrence of an OUTPUT request from the preprocessing section 22 (step S5 in FIG. 5), the output processing section 25 retrieves the output request from the second queue 24 (step S6).

Next, the output processing section examines whether the media resource information necessary for printing prepared by the preprocessing section 22 exists in the character (media) resource storage facility 27 of the output device 23 and decides whether the media resource information needs to be loaded into the output device 23 (step S8), as the output processing section 25 loads into memory which media resource information has been loaded into the media resource storage facility 27.

When the necessary media resource information does not exist in the media resource storage facility 27 of the output device 23, the output processing section 25 reads the deficient character pattern information from the media resource file 26 (step S8). The read character pattern information is then downloaded into the media resource information storage facility 27 of the output device 23 (step S9).

After all of the media resource information necessary for printing has been downloaded into the output device 23, the output processing section issues a hard command (for example, a WRITE command) for instructing printing in accordance with the output information 3 and causes the printer to initiate the printing of print data (step S10).

Since the necessary media resource information is loaded into the output device 23 by those processes before the outputting process is initiated, a situation will not be encountered in which a lack of character pattern information is discovered in the middle of the outputting process, thus interrupting the outputting process to load the deficient information from the outside. Thus, the processing is performed smoothly so that processing efficiency is improved.

Figure 6:
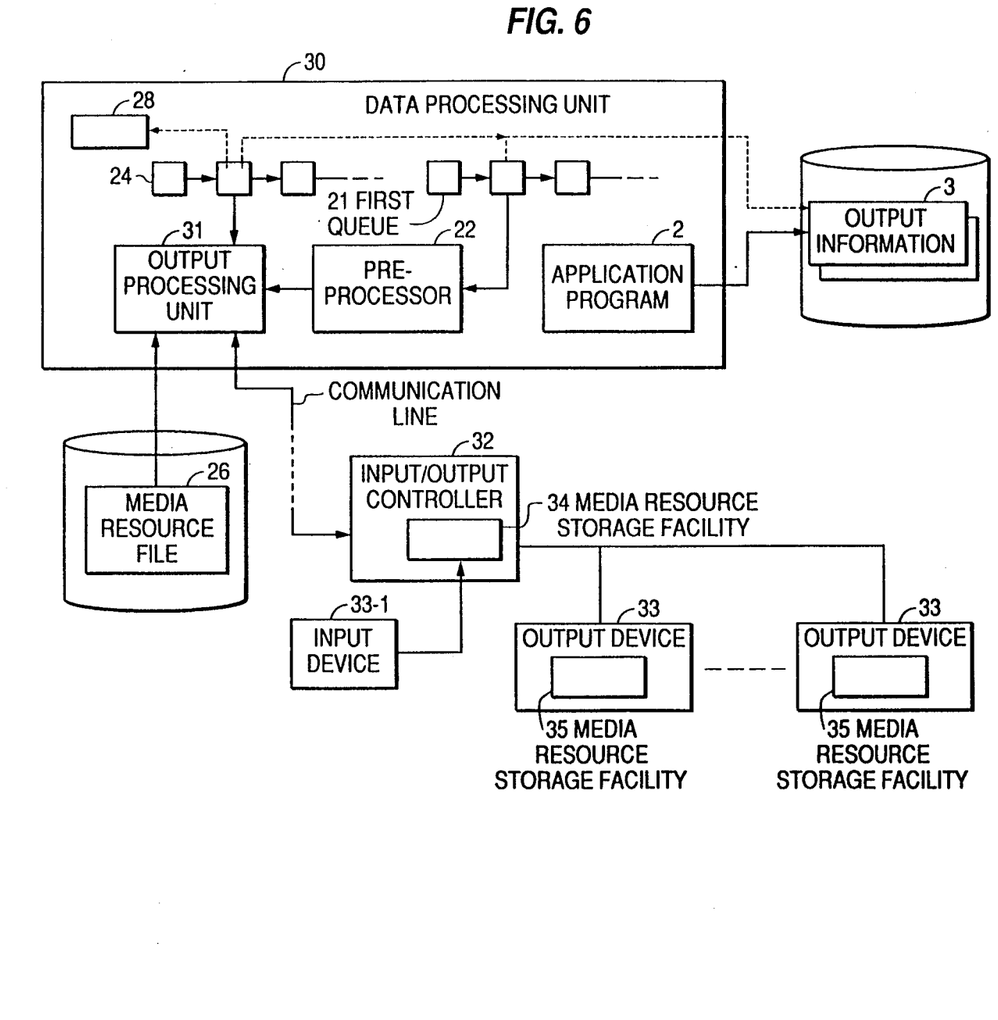
FIG. 6 illustrates an output processing system according to a seconed embodiment of the present invention.

Next, the second embodiment of the present invention will be described with reference to FIG. 6.

In this example, a plurality of input/output devices 33 (an input device, a display device, a printer, etc.) are connected to one data processing unit 30 via an input/output controller 32. The data processing unit 30 and the input/output controller 32 are connected together by a local line or communication line.

The transfer of data between the data processing unit 30 and the input/output devices 33, and the control of the input/output devices 33, are performed by the input/output controller 32.

The output information 3 prepared by the application program 2 is entered into the first queue 21.

The preprocessing section 22 scans the output information 3 entered into the first queue 21 to extract media resource designating information needed in outputting the output information 3, the extracted media resource designating information and the output information 3 being entered into the second queue 24.

When an OUTPUT request is entered into the second queue 24 to make an output request, the output processing section 31 issues a command to the input/output controller 32 to inquire as to whether media resource information specified by media resource designating information entered into the second queue 24 is stored in media resource storage facility 34 of the input/output controller 32 or media resource storage facility 35 of a specified input/output device.

The media resource storage facility 34 of the input/output controller 32 stores media resource information which is shared among the input/output devices 33, while the media resource storage facility 35 of each of the input/output devices 33 stores media resource information which is used by that input/output device only.

Upon receipt of the inquiry from the output processing section 31, the input/output controller 32 informs the output processing section 33 of the type of media resource information stored in the media resource storage facility 35 of the specified input/output device 33 and the type of media resource information stored in its media resource storage facility 34.

Here exemplary inquiry and response commands prepared by the output processing section 31 and the input/output controller 32 will be explained with reference to FIGS. 7 and 8.

Figure 7:
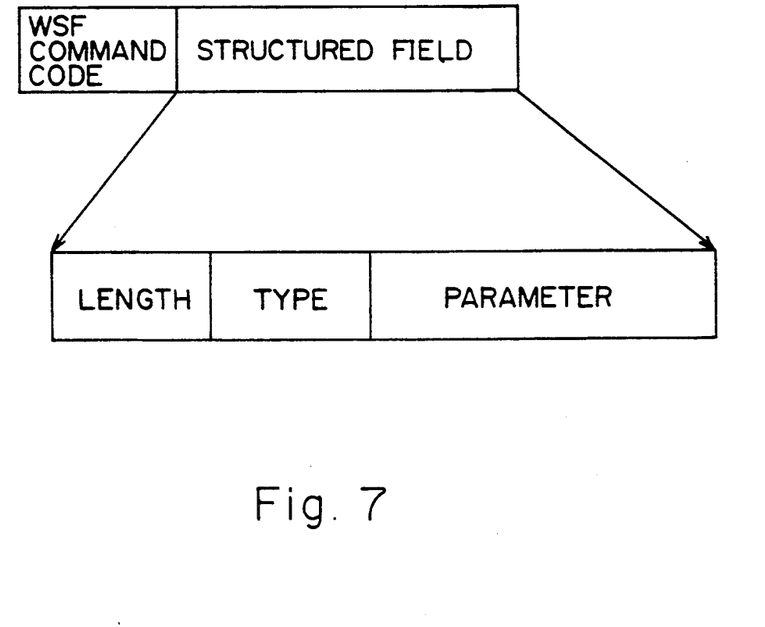
FIG. 7 illustrates an example of an inquiry command.

As illustrated in FIG. 7, the inquiry command is constructed from a command code and a structured field. The structured field comprises "length" indicating the data length, "type" indicating the type of request (for example, for the type of characters) and "variable-length parameter".

Figure 8:
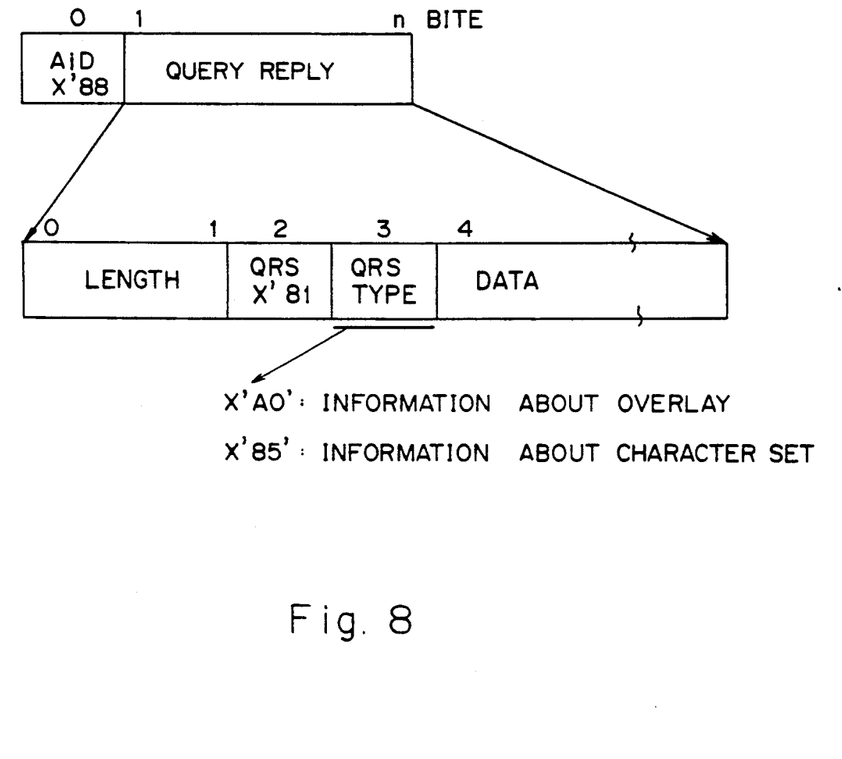
FIG. 8 illustrates an example of a response command.

The response command from the input/output controller 32, as illustrated in FIG. 8, comprises "Ack id" indicating a reply and "Query Reply". The "Query Reply" is constructed from "length" indicating data length, "label name", "QRS" indicating a type and "data part". For example, when QRS=X"A0", the QRS information indicates information about an overlay, while QRS=X"85" indicates information about a character set.

Referring back to FIG. 6, upon receipt of a reply from the input/output controller 32 the output processing section 31 checks media resource designating information entered in the second queue 24 with response information from the input/output controller 32 to decide whether the media resource information necessary for printing or displaying the output information exists in the input/output controller 32 and the output devices 33.

When the necessary media resource information does not exist in the input/output controller 32 and the output devices 33, the output processing section 31 reads the deficient information from the media resource file 26 and outputs it to the input/output controller 32. The input/output controller 32 downloads the received media resource information into the media resource storage facility 35 of the relevant input/output device 33.

After the necessary media resource information has been loaded into the input/output device 33 in this way, the output processing section 31 outputs the output information 3 to the input/output controller 32 to initiate output processing.

The input/output device 33 prints or displays the output information using the media resource information loaded into its media resource storage facility 35. On completion of the output processing, the last state of the media resource storage facility 35 is held as it is.

Figure 9:
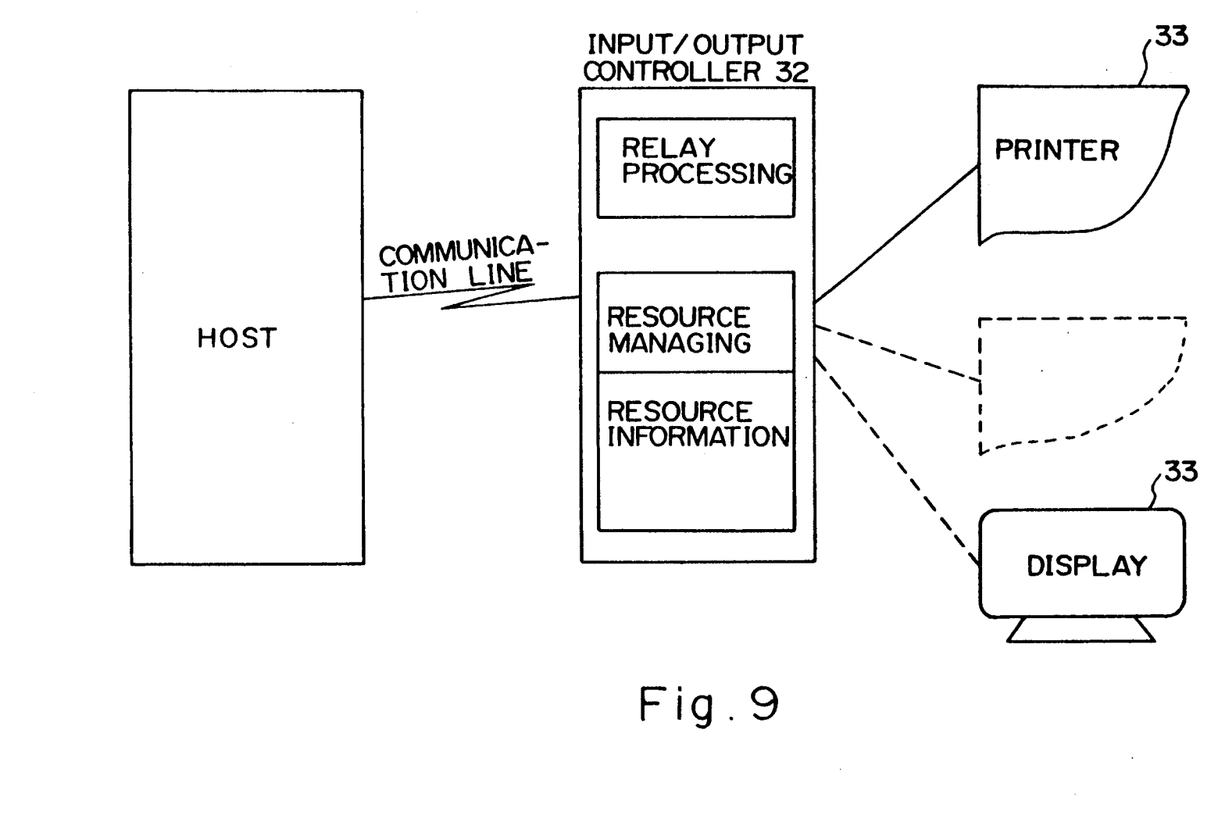
FIG. 9 illustrates an example of a system having an input/output controller.

FIG. 9 illustrates a system configuration in which the input/output controller 32 accommodates a maximum of 16 printers and displays. The input/output controller 32 holds therein resource information shared among the 16 printers and displays and has a function of managing that resource information.

Next, the operation of the system of FIG. 6 will be described with reference to FIG. 10.

Hereinafter a description will be made, based on the assumption that the output information 3 prepared by the application program 2 is print data, of the following two cases: case 1 where a character resource B held by the media resource storage facility 34 of the input/output controller 32 is needed for printing; and case 2 where a character resource E held by the host data processing unit 30 is needed for printing.

Figure 10:
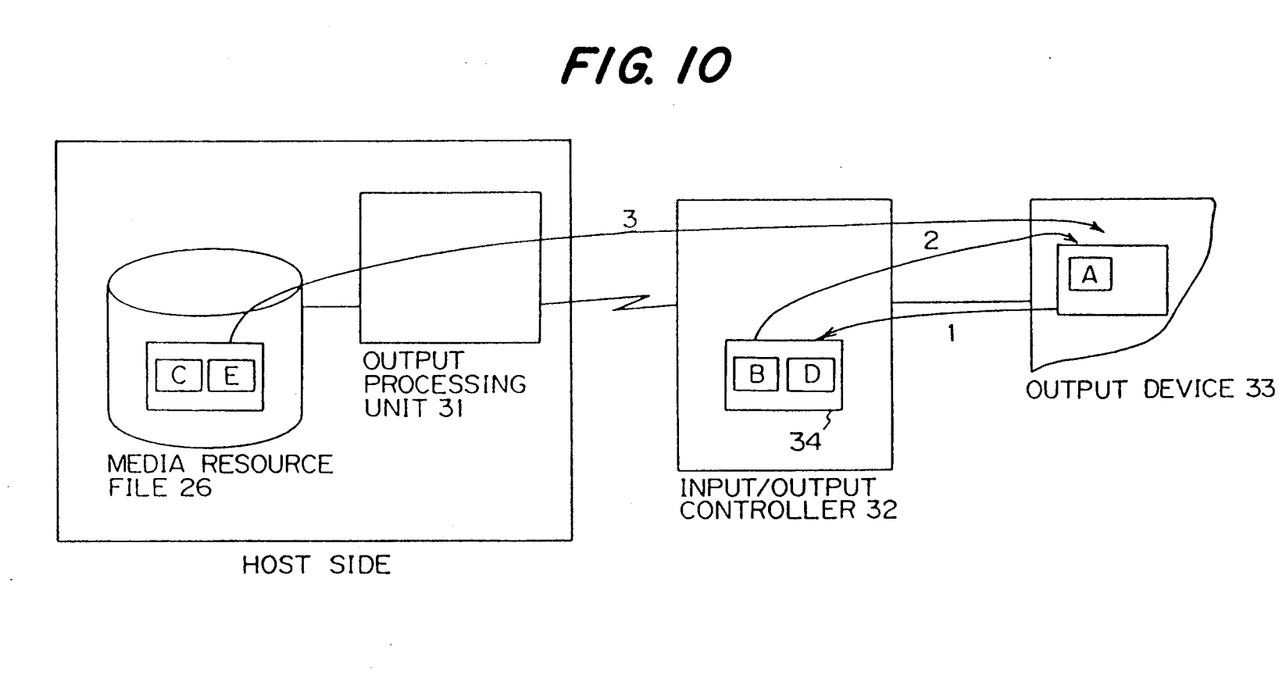
FIG. 10 is a diagram for explaining the operation of the system of FIG. 6.

In case 1, the output device 33 issues to the input/output controller 32 a request to send the character resource B (①) in FIG. 10).

The input/output controller 32 then searches its media resource storage facility 34 for the requested character resource B and downloads it into the output device 33 if it is found ((②) in FIG. 10).

In case 2, the output device 33 issues to the input/output controller 32 a request to send the character resource E.

The input/output controller 32 then searches its media resource storage facility 34 for the requested character resource E and informs the output processing section 31 of its absence if it is not found.

The output processing section 31 reads the requested character resource E from the media resource file 26 and sends it to the input/output controller 32. The input/output controller 32 then downloads the character resource E into the output device 33 ((③) in FIG. 10).

As described above, according to the output processing system of the present invention, when output information is printed or displayed, media resource designating information necessary for the outputting process is extracted from the output information and the media resource information necessary for the output device 33 is downloaded into the output device 33 beforehand, based on the media resource designating information.

Accordingly, the present invention, unlike the prior art, can avoid a situation in which, when a lack of character pattern information and form overlay information necessary for printing or display is found after output processing has been executed, the processing is interrupted to request the data processing unit to send media resource information or deficient characters are printed or displayed as blank, thereby improving output processing efficiency.

Next, a system configuration of the first embodiment of the present invention is described with reference to FIG. 11.

Figure 11:
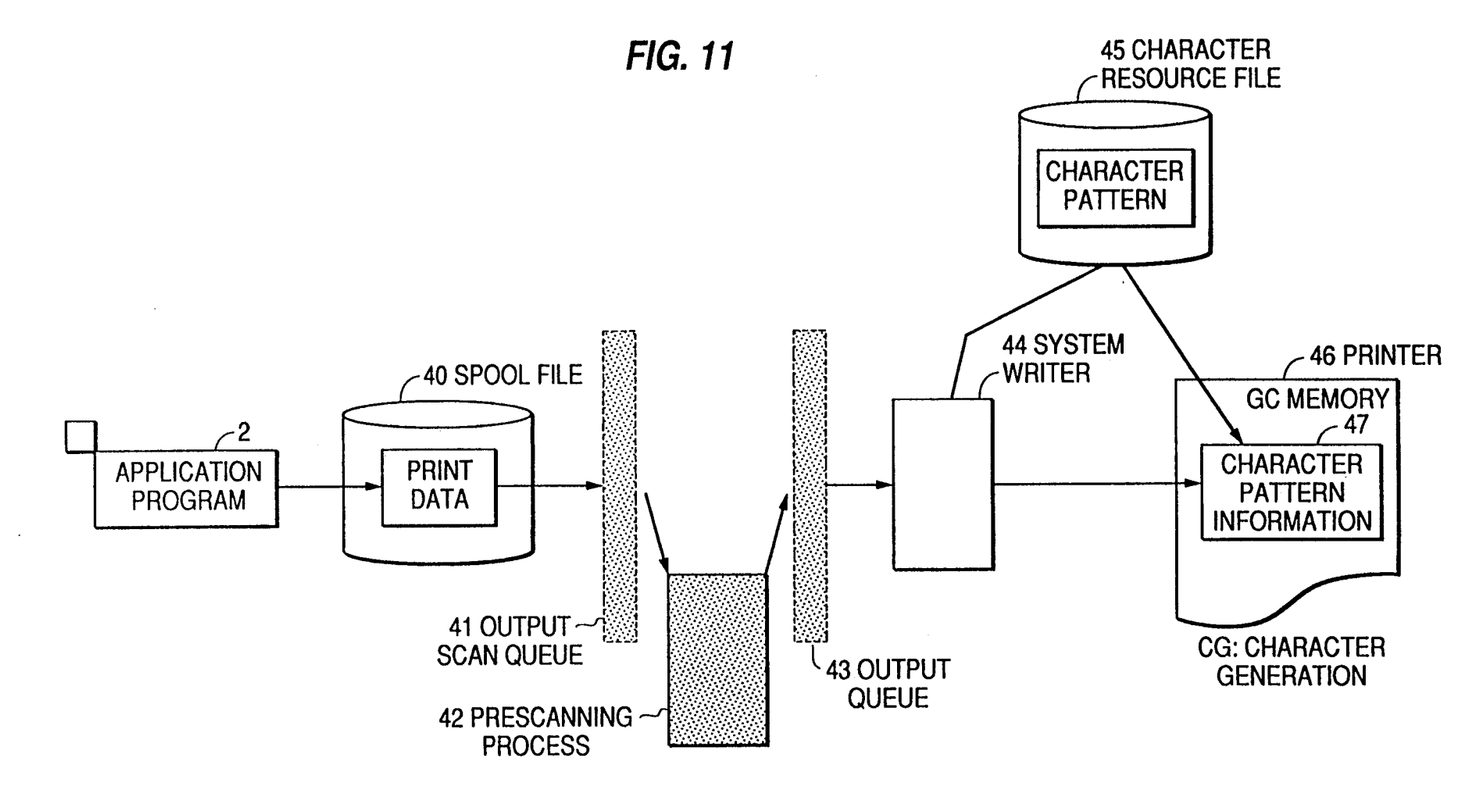
FIG. 11 illustrates a system configuration of the first embodiment of the present invention.

In FIG. 11, print data prepared by the application program 2 is temporarily stored in a spool file 40 such as a magnetic storage medium. On completion of the application program 2, print data prepared by its job (a single unit for processing in a computer) is entered into an output scan queue (the first queue) 41 to be passed to the printing process.

When a processing request is entered into the output scan queue 41, a prescanning process 42 (corresponding to the preprocessing section 22) is executed. The prescanning process executes a process for each output request and extracts character pattern information (style, size and the type of characters) used in print data. The extracted character resource designating information and print data is entered into an output queue 43. The fetching of jobs from a system writer 44 is prohibited during the execution of the prescanning process 42. When the above job is entered into the output queue 43, it is passed to the system writer (corresponding to the output processing section 25, 31) 44.

The system writer 44 reads from the character resource file 45 all the character resource information that is needed for printing, based on character resource designating information and downloads it into a printer 46. The print data is subsequently output to initiate a printing process.

As a result, all of the character resource information needed to print the print data is stored in a CG memory 47 of the relevant printer 46 prior to the initiation of printing, thus obviating the necessity for processing to be interrupted in the middle of printing to wait until needed character resource information is loaded. In addition, the need for each printer to hold more character resources than necessary to avoid interruption of processing due to lack of character resource information is eliminated, thus saving storage capacity of the CG memory 47.

The number of prints can be accurately determined because print data is retrieved previously by the prescanning process 42. This permits a selection between a high-speed printer suitable for a large quantity of print and a low-speed printer suitable for a small quantity of print, depending on the contents of print data, thereby further improving the overall processing efficiency.

Furthermore, in this case, the output scan queue 41 is adapted to scan print data independently of the printing process. Thus, it becomes possible to perform parallel processing without affecting the printing process of the system writer which operates as batch processing.

Next, a third embodiment of the present invention is described with reference to FIG. 12.

Data prepared by a WS (work station) 51 may need to be printed at high speed by a printer 58 on the side of a host computer 53. If their respective code systems differ a code translation needs to be performed on the host computer side. The present embodiment permits the code translation on the host computer side to be performed by the output processing system of the present invention.

Figure 12:
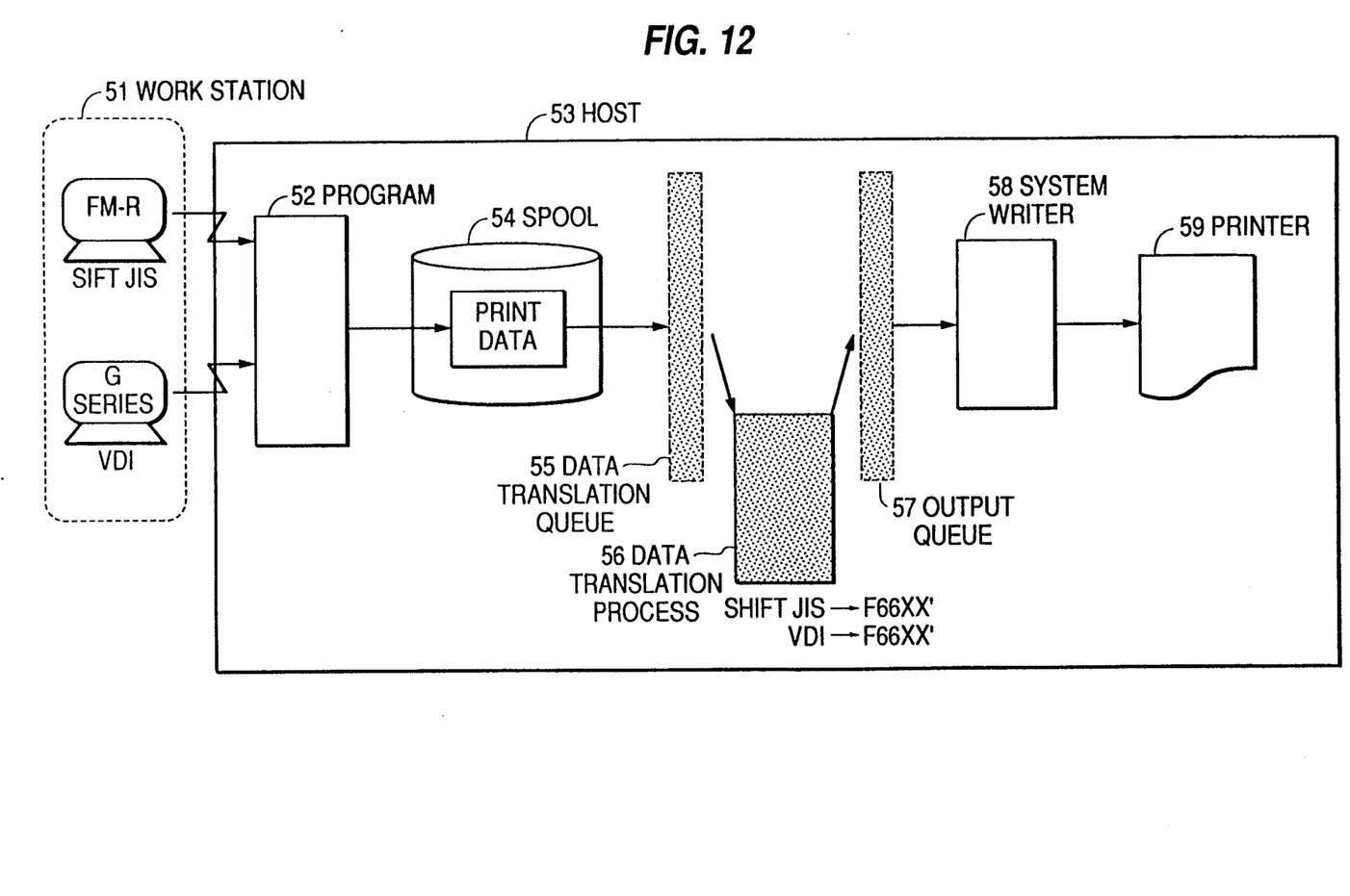
FIG. 12 illustrates a system configuration of a third embodiment of the present invention.

In FIG. 12, upon receipt of print data from the WSs 51, prepared by their respective coding forms such as shift JIS, VDI code, etc., the host computer 53 stores it in a spool 54 with a program 52 which manages linkage between the WS and the host computer. Furthermore, the print data is entered into a data translation queue 55.

When the print data is entered into the data translation queue 55, it becomes impossible to fetch data from a system writer 58. Thus, a data translation process 56 is carried out. By this data translation process 56 the data is translated from the shift JIS or VDI code to, for example, the F66XX code. Furthermore, the print data which has been subjected to the code translation is entered into an output queue 57 to request the system writer 58 to process the data.

The system writer 58 fetches a PRINT request entered into the output queue 57 and outputs it to a printer 59, whereby a printing process is initiated.

In this embodiment, a provision is made of data translation queue 55 into which data-translation needing data sent from the WS 51 is entered for subsequent data translation. Therefore, the code translation can be performed independently of the printing process carried out by the system writer 58.

As described above, according to the output processing system of the present invention, resource information such as character, image and sound that is needed for printing or displaying output information by output devices, such as a printer, a display, etc., can be previously downloaded into a relevant output device. It therefore becomes possible to avoid a situation in which an output device is interrupted for deficient resource information such as character and image or deficient resource information such as character pattern information is printed or displayed as blank.

The output processing system of the present invention may be applied not only to the system configurations described above but also to various system configurations.

Furthermore, output information for processing need not be limited to print data. Various types of data, such as image data, directed graph data, etc., may also be used.

I claim:

1. An output processing system comprising a data processing unit and at least one output device connected thereto and, internal or external media resource information storage connected thereto, said data processing unit comprising:

preprocessing means for extracting media resource designating information from predetermined output information, said media resource designating information designating media resource information needed in outputting the output information from said output device; and output processing means for reading said media resource information designated by said media resource designating information and extracted by said preprocessing means from the internal or external media resource information storage, loading said media resource information read from said storage into said output device and then outputting said output information to said output device to cause said output device to initiate an outputting process responsive to the media resource information.

2. The output processing system according to claim 1, in which said preprocessing means extracts the media resource designating information by scanning the output information.

3. The output processing system according to claim 1, in which said media resource information is character pattern information.

4. The output processing system according to claim 1, in which said media resource information comprises graphic image information.

5. The output processing system according to claim 1, in which said media resource information comprises sound pattern information.

6. The output processing system according to claim 1, in which said output device comprises a printer.

7. The output processing system according to claim 1, in which said output device comprises a display device.

8. The output processing system according to claim 1, in which said media resource designating information determines the type of media resource information.

9. An output processing system comprising a data processing unit and at least one output device connected thereto, and internal or external media resource information storage connected thereto, said data processing unit comprising:

preprocessing means for extracting from output information, prepared by a program, media resource designating information which designates media resource information needed in printing or displaying the output information output by said output device; and output processing means for reading the media resource information designated by said media resource designating information extracted by said preprocessing means from the internal or external media resource information storage, downloading said media resource information read from said storage into said output device and then outputting said output information to said output device to cause said output device to initiate an outputting process responsive to the media resource information.

10. The output processing system according to claim 9, in which said preprocessing means extracts the media resource designating information by scanning the output information.

11. The output processing system according to claim 9, in which said media information is character pattern information.

12. An output processing system comprising a data processing unit and at least one output device connected thereto, and internal or external media resource information storage connected thereto, said data processing unit comprising:

a first queue into which output information prepared by an application program is entered;

prescan processing means for scanning the output information entered into said first queue to extract media resource designating information which designates media resource information needed in outputting said output information;

a second queue into which said media resource information extracted by said prescan processing means and said output information are entered; and system writer means for reading the media resource information specified by information entered into said second queue from internal or external media resource information storage, downloading the media resource information read from said storage into said output device and then outputting the output information to said output device to cause said output device to initiate an outputting process responsive to the media resource information.

13. The output processing system according to claim 12, in which the media information is character pattern information.

14. An output processing system comprising a data processing unit, at least one output device and an input/output controller coupled to said data processing unit through a communication line, and internal or external media resource information storage, coupled to said processing unit, wherein said output device comprises first media resource information storage storing media resource information used by said output device;

said input/output controller comprises second media resource information storage, shared among output devices; and said data processing unit comprises:

preprocessing means for extracting from predetermined output information media resource designating information which designates the media resource information needed in outputting output information from said output device; and output processing means for inquiring of said input/output controller as to whether said media resource information extracted by said preprocessing means is stored in said first media information resource storage in said input/output controller or in said second media information resource storage in said output device, said output processing means, when a response from said input/output controller indicating that part or all of the media resource information is not stored in said first media resource information storage in said input/output controller or in said second media information resource storage in said output device, reading the media resource information from said internal or external media resource information storage, loading the media resource information read from said internal or external media resource information storage into said input/output controller and then outputting the output information to said input/output controller to cause said output device to initiate an outputting process responsive to the media resource information.

15. The output processing system according to claim 14, in which the media information is character pattern information.

16. An output processing system comprising a data processing unit and at least one output device, said data processing unit comprising:

a data translation queue into which externally input data that is coded in a different form is entered;

data translation processing means for translating data entered into said data translation queue to a coding form used in said data processing unit;

an output queue into which code-translated data is entered; and a system writer for fetching the code-translated data entered into said output queue and sending it to said output device.

17. An output processing system comprising a data processing unit and at least one output device coupled thereto, and, internal or external media resource information storage coupled thereto, said data processing unit comprising:

preprocessing means for extracting from predetermined output information media resource information needed in outputting the output information from said output device; and output processing means for reading the media resource information extracted by said preprocessing means from internal or external media resource information storage, loading said media resource information read from said storage into said output device and then outputting said output information to said output device to cause said output device to initiate an outputting process responsive to said media resource information.

18. An output processing system comprising a data processing unit, at least one output device and an input/output controller coupled to said data processing unit through a communication line, wherein said output device comprises media resource storage for storing media resource information used by itself;

said input/output controller comprises media resource information that is shared among output devices; and said data processing unit comprises:

preprocessing means for extracting from predetermined output information media resource information needed in outputting output information from said output device; and output processing means for inquiring of said input/output controller as to whether or not media resource information extracted by said preprocessing means is stored in said media resource storage in said input/output controller or said output device; said output processing means, when a response from said input/output controller in that part or all of the media resource information is not stored in said media resource storage in said input/output controller or said output device, reading the media resource information from internal or external media resource information storage, loading the media resource information read from said storage into said input/output controller and then outputting the output information to said input/output controller to cause said output device to initiate an outputting process.

19. An output processing system outputting output information and comprising a data processing unit and at least one output device connected thereto, said output information comprising output device control information and output print/display information, said data processing unit comprising:

a storage device storing the output information;

a first queue connected to the storage device and receiving the output information from the storage device;

a preprocessor connected to said first queue and said preprocessor extracting the output device control information from said output information; and an output processor connected to said preprocessor and receiving and transferring said output device control information from said preprocessor to the at least one output device, said output processor then receiving and transferring said output display/print information to the at least one output device.

* * * * *

UNITED STATES PATENT AND TRADEMARK OFFICE
CERTIFICATE OF CORRECTION

PATENT NO. : 5,313,565
DATED : May 17, 1994
INVENTOR(S) : Yoshio Mori

It is certified that error appears in the above-indentified patent and that said Letters Patent is hereby corrected as shown below:

Title page: Item [57] Abstract , line 9, after "device" insert --,--.

Col. 5, line 17, after "information", first occurrence, insert --,--.

Col. 7, line 17, between "process" and "executes" insert --42--.

Signed and Sealed this

Sixth Day of September, 1994

Attest:

BRUCE LEHMAN

Attesting Officer

Commissioner of Patents and Trademarks